United States Patent
Park et al.

(10) Patent No.: US 6,188,910 B1
(45) Date of Patent: Feb. 13, 2001

(54) METHOD FOR CONNECTING MOBILE STATIONS TO BASE STATION IN RADIO COMMUNICATION SYSTEM

(75) Inventors: Su-Won Park; Joong-Ho Jeong, both of Seoul (KR)

(73) Assignee: Samsung Electronics Co., Ltd. (KR)

( * ) Notice: Under 35 U.S.C. 154(b), the term of this patent shall be extended for 0 days.

(21) Appl. No.: 09/152,562

(22) Filed: Sep. 14, 1998

(30) Foreign Application Priority Data

Sep. 13, 1997 (KR) .................................................. 97-47455

(51) Int. Cl.⁷ ........................................................ H04B 7/00
(52) U.S. Cl. ............................ 455/509; 455/434; 455/515
(58) Field of Search .................................... 455/509, 434, 455/515, 166.1, 528, 343, 510; 370/335, 342, 445

(56) References Cited

U.S. PATENT DOCUMENTS

| | | |
|---|---|---|
| 4,612,637 | 9/1986 | Davis et al. . |
| 4,977,612 * | 12/1990 | Wilson ............................. 455/166.1 |
| 5,123,029 | 6/1992 | Bantz et al. . |
| 5,278,835 | 1/1994 | Ito et al. . |
| 5,331,316 | 7/1994 | Mestdagh et al. . |
| 5,581,802 | 12/1996 | Erickson et al. . |
| 5,673,259 * | 9/1997 | Quick, Jr. ............................. 370/342 |
| 5,680,398 | 10/1997 | Robinson . |
| 5,729,542 | 3/1998 | Dupont . |
| 5,752,193 | 5/1998 | Scholefield et al. . |
| 5,778,316 * | 7/1998 | Persson et al. ....................... 455/434 |
| 5,790,941 * | 8/1998 | Peponides ............................ 455/343 |
| 6,002,664 * | 12/1999 | Schachter ............................. 370/335 |

FOREIGN PATENT DOCUMENTS

| | | |
|---|---|---|
| 0734191 | 9/1996 | (EP) . |
| 2277849 | 11/1994 | (GB) . |
| 2297013 | 7/1996 | (GB) . |

\* cited by examiner

*Primary Examiner*—Nay Maung
*Assistant Examiner*—Quochien B. Vuong
(74) *Attorney, Agent, or Firm*—Dilworth & Barrese, LLP.

(57) ABSTRACT

A method for preventing a collision among access requests made from a plurality of mobile stations requesting access to a base station in a radio communication system having a plurality of forward link and reverse link access channels. The base station allocates one of the forward link channels as a broadcast channel and transmits channel information about currently available reverse link access channels to the mobile stations via the broadcast channel. Based on the channel information received via the broadcast channel, one or more of the mobile stations transmits an access request signal to the base station via a selected one of the currently unoccupied reverse link access channels. Upon receipt of an access approval signal from the base station, the access requested mobile station accesses the base station via the selected unoccupied access channel.

1 Claim, 5 Drawing Sheets

FCH : FORWARD LINK CHANNEL
RCH : REVERSE LINK CHANNEL

METHOD FOR CONNECTING MOBILE STATIONS TO BASE STATION IN RADIO COMMUNICATION SYSTEM

BACKGROUND

1. Technical Field

The present application relates generally to a radio communication system and, more particularly, to a method for accessing a base station by mobile stations, which provides a reduction in access time and prevents collisions between access requests made from a plurality of mobile stations on the same access channel.

2. Description of the Related Art

In general, as shown in FIG. 1, a plurality of mobile stations (MSs) MS#1–MS#n are wirelessly connected to a single base station (BS) 100 in a radio communication system. Although mobile stations can generally be applied to various fields, FIG. 1 illustrates mobile stations MS#1–MS#n being mounted on a vehicle.

Conventionally, in order to accomplish communication between the base station 100 and one of the mobile stations MS#1–MS#n, an access operation (i.e., an access request by the mobile station and an access approval by the base station) through a specified access channel must first be performed. The mobile station transmits an access request signal to the base station through one of a plurality of access channels to communicate with the base station. If the access requested channel is not currently occupied, the mobile station can communicate with the base station via the access channel. If the access requested channel is already occupied, however, or if two different mobile stations MS#1 and MS#2 simultaneously make access requests through the same access channel RCH#1 (as illustrated in FIG. 2), a collision will occur between the access requests, which prevents either mobile station from accessing the base station. In this situation, the mobile stations will attempt to access the base station after some time.

Referring to FIG. 3, another conventional method for accessing a base station involves allocating time slots TS#1–TS#n to the mobile stations MS#1–MS#n, respectively, so as to prevent potential collisions among the mobile stations during access request operations. One disadvantage to this method, however, is that a longer access time is required for accessing the base station 100 since the mobile stations MS#1–MS#n can only make access requests during their allocated time slots. For instance, even if mobile station MS#2 does not make an access request, mobile station MS#3 cannot use the time slot TS#2 allocated to MS#2, and can only make an access request during the allocated time slot TS#3 after the passage of time slot TS#2.

SUMMARY OF THE INVENTION

It is therefore an object of the present invention to provide a method for preventing collisions among the access requests, when a plurality of mobile stations request access to a base station in a radio communication system.

It is another object of the present invention to provide a method for reducing an access time required when a mobile station accesses a base station in a radio communication system.

To achieve the above objects and other advantages, a method is provided for connecting mobile stations to a base station in a radio communication system having a plurality of channels. In the method, the base station allocates one of the channels as a broadcast channel, and then transmits channel information about the access channels currently occupied to the mobile stations via the broadcast channel. Any one of the mobile stations can transmit an access request signal to the base station via an unoccupied access channel based on the channel information received from the base station via the broadcast channel. Upon receipt of an access approval signal from the base station, the mobile station seeking access to the base station can then obtain access via the unoccupied channel.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

Figure 1:
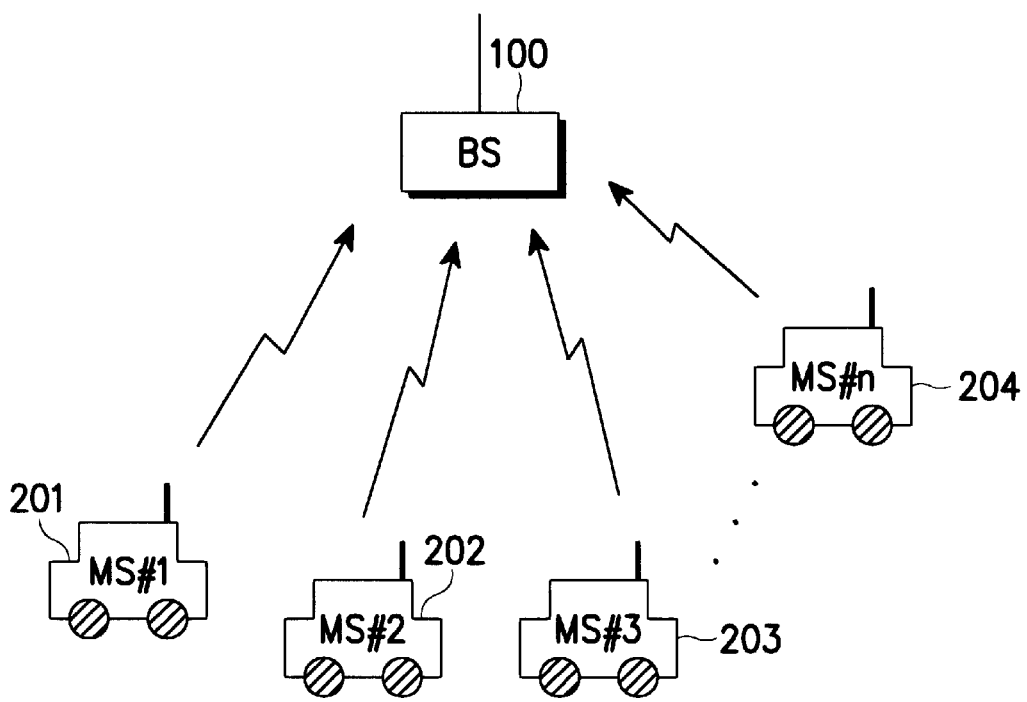
FIG. 1 is a diagram which illustrates a connection from a plurality of mobile stations to a base station in a common radio communication system.
Figure 2:
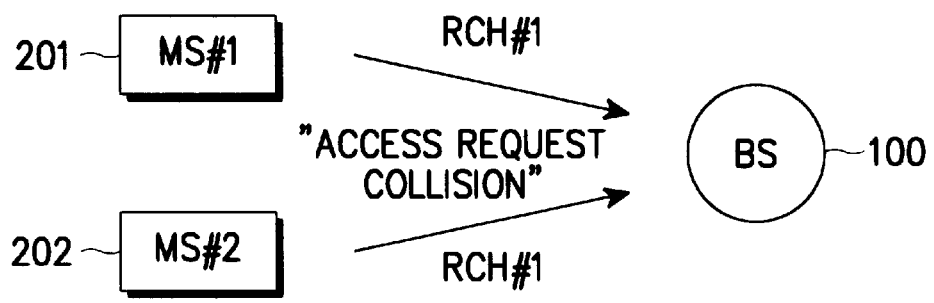
FIGS. 2 and 3 are diagrams which illustrate conventional access methods in a radio communication system.
Figure 3:
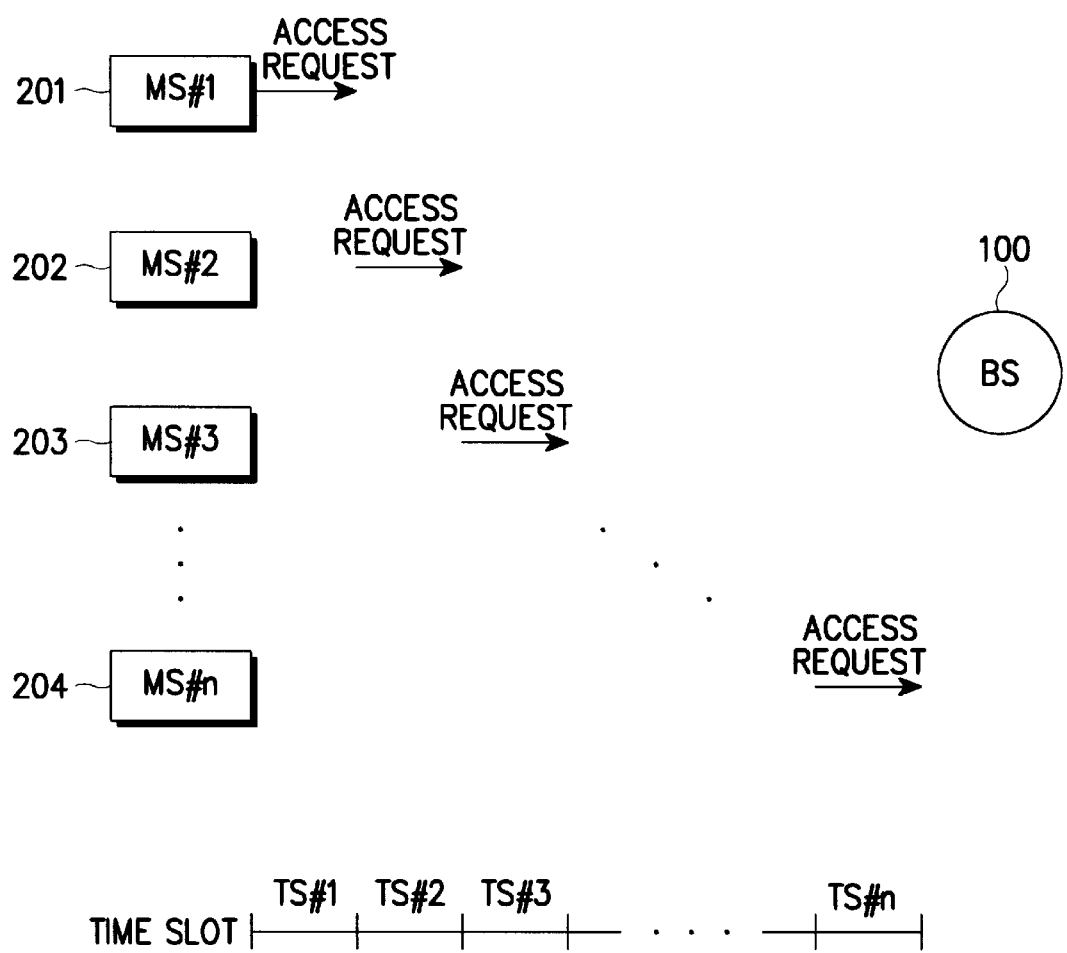

It is to be understood that in the following description of preferred embodiments, specific details are set forth to provide a more thorough understanding of the present invention, notwithstanding that one skilled in the art may practice the invention without these specific details. In other instances, a detailed description of well known functions or constructions have been omitted so as to not obscure the present invention. It is to be further understood that in the accompanying drawings, similar reference numerals are used to denote elements having similar or equivalent constructions.

Figure 4:
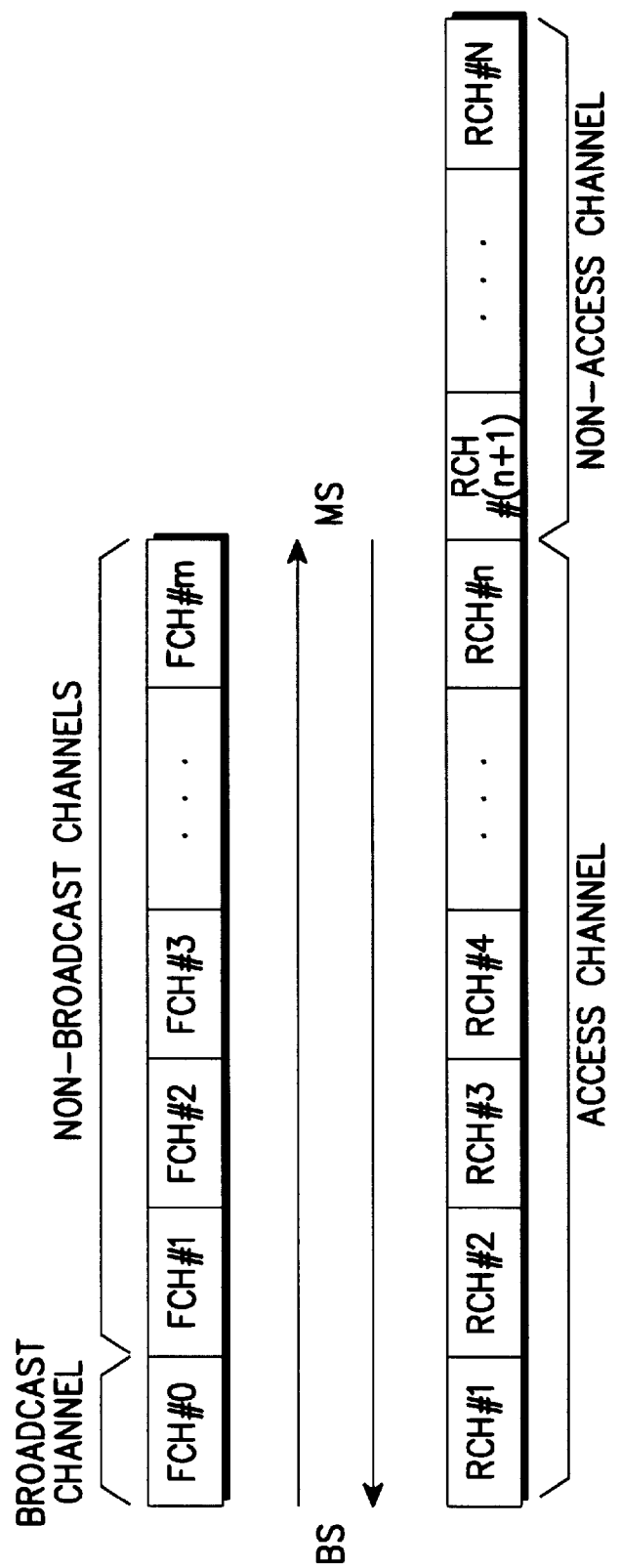
FIG. 4 is a diagram which illustrates a channel configuration according to one aspect of the present invention.

It is to be noted that, as shown in FIG. 1, the present invention can be applied to a radio communication system including a single base station and a plurality of mobile stations. Referring now to FIG. 4, a diagram illustrates a channel configuration in accordance with one aspect of the present invention. In particular, a forward link (BS→MS) channel FCH#0 is allocated for a broadcast channel and reverse link (MS→BS) channels RCH#1–RCH#n refer to access channels. The broadcast channel FCH#0 is used by the base station to transmit information to each mobile station regarding the current occupation of the access channels (RCH#1–RCH#n).

Figure 5:
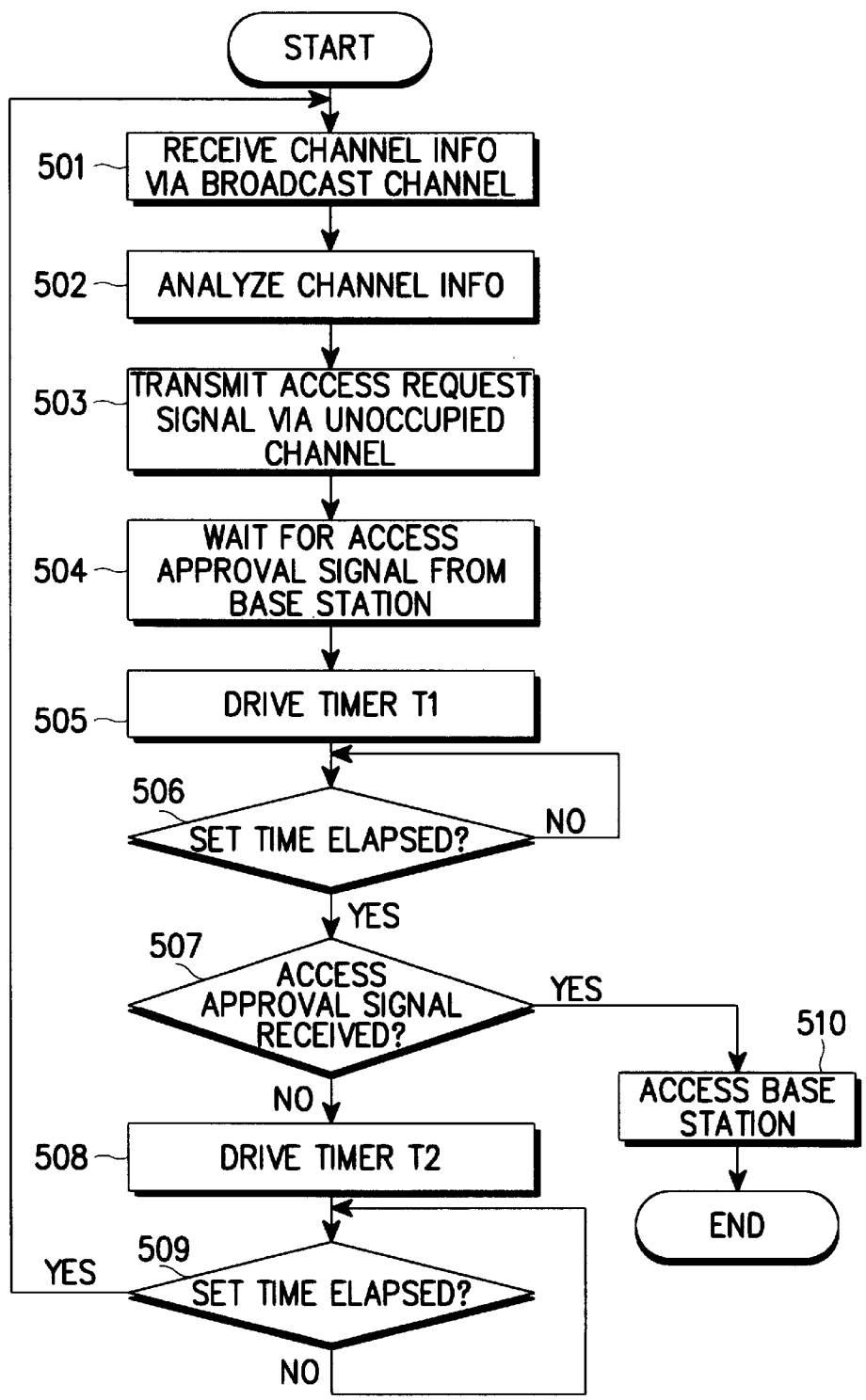
FIG. 5 is a flow chart which illustrates a method for accessing a base station in radio communication system according to one aspect of the present invention.
Figure 6:
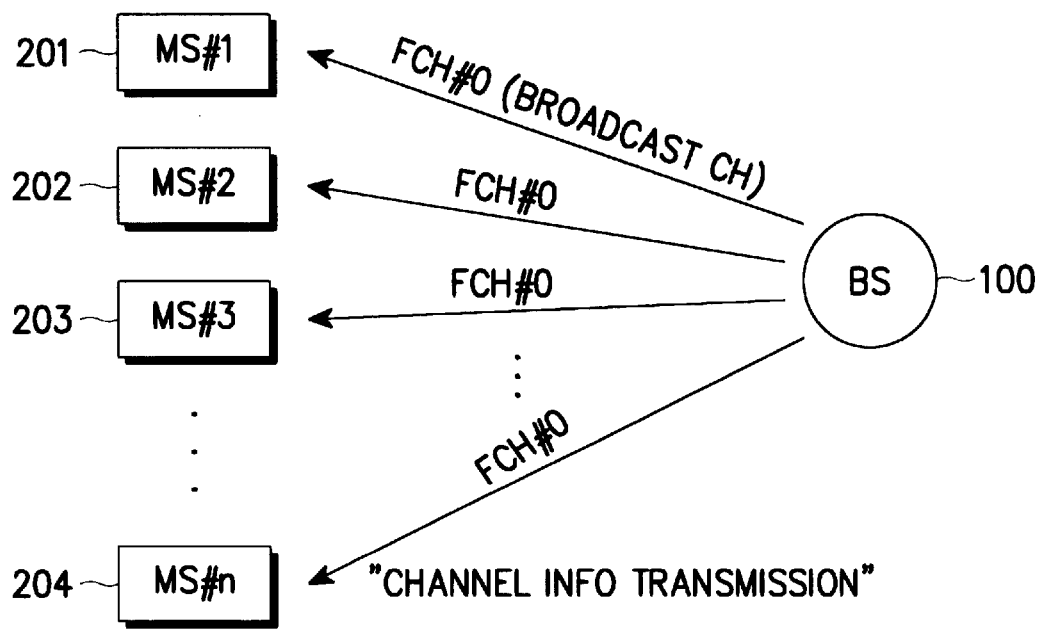
FIG. 6 is a diagram which illustrates a base station transmitting channel information to a plurality of mobile stations according to one aspect of the present invention.

Referring now to FIG. 5, a flow chart illustrates a method for accessing a base station by a mobile station in accordance with one aspect of the present invention. In the following description, it is assumed that mobile station MS#1 makes an access request to the base station 100. During the access operation, the base station 100 continuously transmits channel information about the current availability of reverse link access channels (which can be utilized for an access operation) to mobile station MS#1 via the broadcast channel FCH#0, and the mobile station MS#1 receives the channel information (step 501). It is to be understood that, as shown in FIG. 6, the channel information is transmitted from the base station 100 via the broadcast channel to every other mobile station MS#2–MS#n.

The mobile station MS#1 then analyzes the channel information received via the broadcast channel FCH#0 (step 502). Next, mobile station MS#1 transmits an access request signal to the base station 100 via an unoccupied access channel (e.g., RCH#2) based on the channel information received from the base station 100 (step 503). Then, in steps 504 to 507, it is determined whether a collision occurs between the access request made by mobile station MS#1 through the access requested channel RCH#2 and other possible access requests made by other mobile station via the same access channel. Specifically, after mobile station MS#1 transmits an access request signal to the base station 100 via the unoccupied access channel RCH#2 (step 503), it will wait for an access approval signal from the base station 100 (step 504). The mobile station MS#1 enables a first timer T1 provided therein (step 505). Next, a determination is made as to whether a first preselected time has elapsed from the time the timer T1 is enabled (step 506). If the first preselected time has elapsed (affirmative result in step 506), a determination is then made (by mobile station MS#1) as to whether an access approval signal has been received from the base station 100 (step 507). If the access approval signal is received (affirmative result in step 507), it is determined that no collision has occurred between access requests made from mobile station MS#1 and other mobile stations (e.g., MS#2–MS#n) via the access requested channel, and mobile station MS#1 will access the base station 100 via the requested access channel (e.g., the unoccupied channel RCH#2) upon receipt of the access approval signal (step 510).

Figure 7:
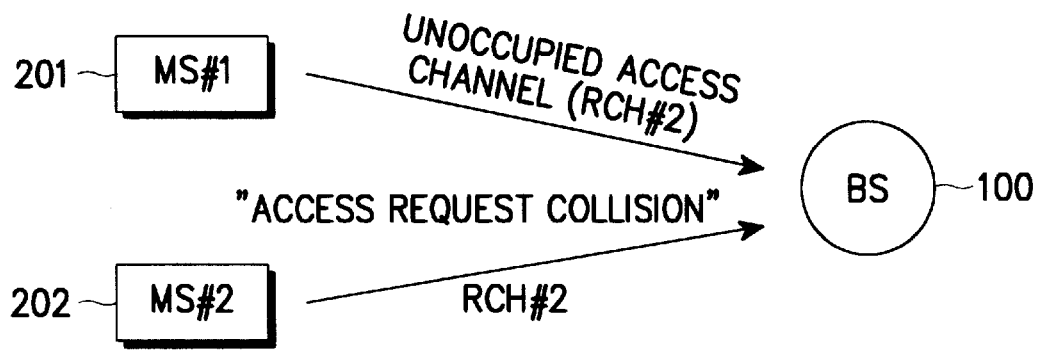
FIG. 7 is a diagram which illustrates two mobile stations making access requests through the same unoccupied access channel.

On the other hand, if the access approval signal is not received at the lapse of the first preselected time (negative result at step 507), it is determined that a collision has occurred between two or more access requests made via the same access requested channel. Accordingly, if a collision occurs (as illustrated in FIG. 7), mobile station MS#1 will repeat the access method discussed above (return to step 501) after the expiration of a second preselected time (steps 508 and 509). Specifically, mobile station MS#1 will first enable a second timer T2 provided therein (step 508), and then determine whether the second preselected time has elapsed from the time the timer T2 is enabled (step 509). Once it is determined that the second preselected time has elapsed (affirmative result as step 509), the mobile station repeats the access operation (return to step 501). The procedure is continuously repeated until it is determined (at step 507) that no collision has occurred between access requests (i.e. until the access approval signal is received from the base station 100). Once it is determined that no collision occurs, the mobile station MS#1 will access the base station 100 through the unoccupied access requested channel.

As described above, a mobile station can access a base station through an unoccupied access channel based on channel information transmitted from a mobile station. As a result, potential collisions that may occur when a mobile station makes an access request via an occupied access channel can be avoided. In addition, the access time can be reduced.

Although an illustrative embodiment of the present invention has been described herein with reference to the accompanying drawings, it is to be understood that the invention is not limited to that precise embodiment, and that various other changes and modifications may be affected therein by one skilled in the art without departing from the scope or spirit of the invention. All such changes and modifications are intended to be included within the scope of the invention as defined by the appended claims.

What is claimed is:

1. A method for accessing a base station in a radio communication system, comprising the steps of:

(a) allocating, at said base station, one of a plurality of forward link channels as a broadcast channel, and transmitting channel information about currently available reverse link access channels to at least one mobile station via said broadcast channel;

(b) analyzing said channel information by said mobile station, and transmitting an access request signal to said base station via a selected one of unoccupied reverse link access channels based on said analyzed channel information;

(c) determining whether a collision occurs between said access request signal and another access request signal transmitted on said selected unoccupied reverse link access channel within a first predetermined time period;

(d) transmitting an access approval signal from said base station to said access requested mobile station when it is determined that no collision occurs within the first predetermined time period;

(e) establishing communication between said access requested mobile station and said base station upon receipt of said access approval signal; and (f) returning to step (b) after a second predetermined time period has elapsed when said access approval signal is not received during the first predetermined time period.

* * * * *